(12) United States Patent
Lincke et al.

(10) Patent No.: US 6,360,272 B1
(45) Date of Patent: Mar. 19, 2002

(54) METHOD AND APPARATUS FOR MAINTAINING A UNIFIED VIEW OF MULTIPLE MAILBOXES

(75) Inventors: Scott D. Lincke, San Carlos; Gregory M. Toto, San Francisco; Michael E. Golden, Montara, all of CA (US)

(73) Assignee: Palm, Inc., Santa Clara, CA (US)

(*) Notice: Subject to any disclaimer, the term of this patent is extended or adjusted under 35 U.S.C. 154(b) by 0 days.

(21) Appl. No.: 09/321,984

(22) Filed: May 28, 1999

(51) Int. Cl.[7] .................. G06F 15/173; G06F 15/16
(52) U.S. Cl. .................. 709/238; 709/23; 709/206; 709/218; 709/226; 709/228; 379/88.17; 379/88.18; 379/88.22; 370/352
(58) Field of Search ................ 709/238, 206, 709/203, 218, 226, 228; 379/88.17, 88.18, 88.22; 370/352

(56) References Cited

U.S. PATENT DOCUMENTS

| | | | |
|---|---|---|---|
| 4,432,057 A | 2/1984 | Daniell et al. | 364/300 |
| 4,807,182 A | 2/1989 | Queen | 364/900 |
| 4,866,611 A | 9/1989 | Cree et al. | 364/300 |
| 4,875,159 A | 10/1989 | Cary et al. | 364/200 |
| 4,956,809 A | 9/1990 | George et al. | 364/900 |
| 5,001,628 A | 3/1991 | Johnson et al. | 364/200 |
| 5,065,360 A | 11/1991 | Kelly | 395/800 |
| 5,124,909 A | 6/1992 | Blakely et al. | 395/200 |
| 5,142,619 A | 8/1992 | Webster, III | 395/157 |
| 5,159,592 A | 10/1992 | Perkins | 370/85.7 |
| 5,187,787 A | 2/1993 | Skeen et al. | 395/600 |
| 5,210,868 A | 5/1993 | Shimada et al. | 395/600 |
| 5,237,678 A | 8/1993 | Kuechler et al. | 395/600 |
| 5,251,291 A | 10/1993 | Malcolm | 395/146 |
| 5,261,045 A | 11/1993 | Scully et al. | 395/161 |
| 5,261,094 A | 11/1993 | Everson et al. | 395/600 |
| 5,272,628 A | 12/1993 | Koss | 364/419.19 |

(List continued on next page.)

FOREIGN PATENT DOCUMENTS

| | | |
|---|---|---|
| EP | 0 772 327 A2 | 5/1997 |
| WO | WO 96/19064 | 6/1996 |
| WO | WO 97/33421 | 9/1997 |

OTHER PUBLICATIONS

"Zap It", 28 pages, Dec. 30, 1997, http://www.dtswireless.com/0 home/0pg home.html.

(List continued on next page.)

*Primary Examiner*—David Wiley
*Assistant Examiner*—Frantz Jean
(74) *Attorney, Agent, or Firm*—Hickman Palermo Truong & Becker LLP; Van Mahamedi

(57) ABSTRACT

A method of presenting a unified view of two mailboxes, each mailbox associated with a client is described. The unified view allows the user to see all actions she/he performed on a message in one mailbox performed in all other unified mailboxes. One of the clients has both a high cost, e.g. wireless, communication channel and a low cost, e.g. synchronization, communication channel. When a message is received by a client from its respective mailbox without an identifier, an identifier is generated and a copy of the message is sent to the other mailboxes with the identifier. When the user performs actions on a message with a client, the identifier for the message and the action can be conveyed to the other clients in a message to the other mailboxes. The unified view can be selectably updated either over the high cost communication channel or the low cost communication channel. The presence of two communication channels enables the cost of performing the unification to be contained. The user can select options to control the unification process and the use of the high cost communication channel, e.g. summarize messages over 250 words and/or remove attachments.

28 Claims, 3 Drawing Sheets

| | | | |
|---|---|---|---|
| 5,751,960 A | 5/1998 | Matsunaga | 395/200.36 |
| 5,758,354 A | 5/1998 | Huang et al. | 707/201 |
| 5,761,439 A | 6/1998 | Kar et al. | 395/200.78 |
| 5,812,819 A | 9/1998 | Rodwin et al. | 395/500 |
| 5,819,172 A | 10/1998 | Campana, Jr. et al. | 455/412 |
| 5,819,284 A | 10/1998 | Farber et al. | 707/104 |
| 5,835,061 A | 11/1998 | Stewart | 342/457 |
| 5,838,252 A | 11/1998 | Kikinis | 340/825.44 |
| 5,845,282 A | 12/1998 | Alley et al. | 707/10 |
| 5,857,201 A | 1/1999 | Wright, Jr. et al. | 707/104 |
| 5,864,604 A | 1/1999 | Moen et al. | 379/88 |
| 5,867,821 A | 2/1999 | Ballantyne et al. | 705/2 |
| 5,889,845 A | 3/1999 | Staples et al. | 379/211 |
| 5,941,954 A | 8/1999 | Kalajan | 709/239 |
| 5,941,956 A | 8/1999 | Shirakihara et al. | 709/245 |
| 5,948,059 A * | 9/1999 | Woo et al. | 709/206 |
| 5,951,638 A * | 9/1999 | Hoss et al. | 709/206 |
| 5,964,833 A | 10/1999 | Kikinis | 709/206 |
| 5,966,714 A * | 10/1999 | Huang et al. | 707/201 |
| 5,978,837 A | 11/1999 | Foladare et al. | 709/207 |
| 5,987,508 A | 11/1999 | Agraharam et al. | 709/217 |
| 5,995,597 A | 11/1999 | Woltz et al. | 379/93.24 |
| 6,018,762 A | 1/2000 | Brunson et al. | 709/206 |
| 6,023,700 A | 2/2000 | Owens et al. | 707/10 |
| 6,035,104 A | 3/2000 | Zahariev | 395/200.33 |
| 6,052,563 A | 4/2000 | Macko | 455/38.2 |
| 6,138,146 A | 10/2000 | Moon et al. | 709/206 |

OTHER PUBLICATIONS

"Connectivity Pack for the HP 95LX" User's Guide, Hewlett Packard Co., (1991), pp. 1–1 to 6–5.

Droms, R., "Dynamic Host Configuration Protocol", Request for Comments 190 1541, Oct. 1993, 24 pages.

"Redline, Strikeout, and Document Comparison", pp. 429–435.

"LapLink for Windows SpeedSync", printed for Traveling Software, Inc. website.

"Introducing Window 95" Microsoft Windows 95—For the Microsoft Windows Operating System, Microsoft Corporation, (1995), p. 66.

Madnick, S. et al., "Logical Connectivity: Applications, Requirements, Architecture, and Research Agenda", IEEE (1991), pp. 142–153.

"IntelliLink" The Intelligent Link, Microsoft Windows 3 Personal Information Managers, IntelliLink, Inc., (1990).

Zahn, L. et al., "Network Computing Architecture", Prentice Hall, New Jersey, pp. 1–209.

Cobb, D. et al., "Paradox 3.5 Handbook" Third Edition, Borland Bantam, New York, Oct. 1991, pp. 803–816.

Allfieri, V., "The Best Book of: WordPerfect Version 5.0", Hayden Books, Indianapolis, IN (1988), pp. 151–165.

"PC–Link Release 2 for the Casio B.O.S.S. Business Organizer Scheduling System", Travelling Software, Inc., (1989), pp. 1–60.

"I/O Applications Note" Serial Communications Using the HP 95LX, Hewlett Packard, pp. 1–12.

"Open Network Computing Technical Overview", Sun Microsystems, Inc., pp. 1–32.

"Sharp Organizer Link II, Model OZ–890" Operation Manual, pp. 1–105.

Dialog search results for references generally related to Palmtops, 15 pages.

* cited by examiner

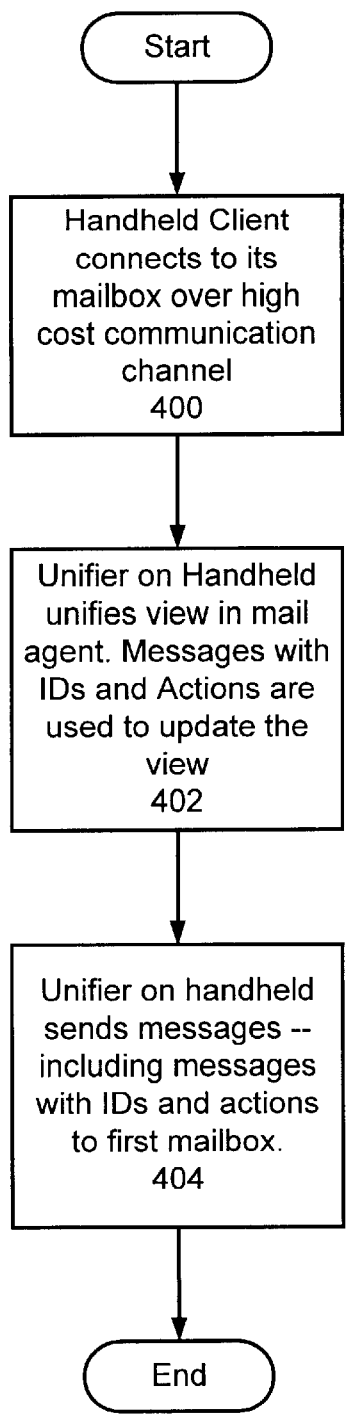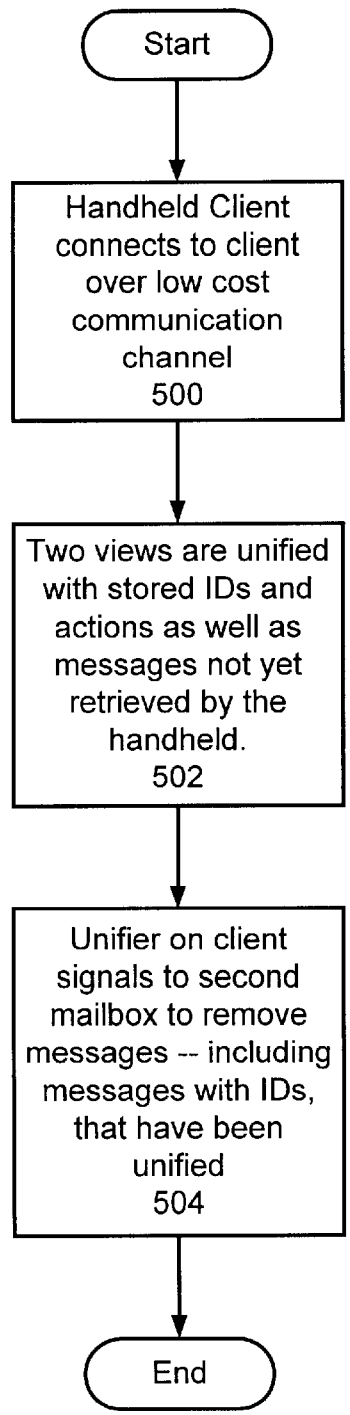
FIG 4
FIG 5

METHOD AND APPARATUS FOR MAINTAINING A UNIFIED VIEW OF MULTIPLE MAILBOXES

BACKGROUND OF THE INVENTION

1. Field of the Invention

This invention relates to the field of electronic messaging systems. In particular, the invention relates to a method and apparatus for presenting a unified view of multiple mailboxes on multiple clients.

2. Description of the Related Art

Electronic message systems, or e-mail systems, enable widespread communications. A typical person may have several mailboxes she/he accesses with different clients, e.g. office computer and handheld computer. For example, Jane Doe might have a corporate mailbox "jdoe@corporate.com" as well as a mailbox with a wireless provider such as "jdoe@wireless.com". If Jane wishes to be able to receive and work on her messages both while at the office and while on the road she may want a way to create a unified view of the two separate mailboxes on her office client and her handheld client.

Maintaining a unified view of messages sent to a single mailbox can be tricky if the user accesses a single mailbox from multiple locations. Two separate Internet protocols provide varying degrees of support for addressing this problem: the Post Office Protocol version 3 (POP3), defined by RFC 1939, and the Internet Message Access Protocol version 4 (IMAP4), defined by RFC 1730.

With varying degrees of functionality, these protocols rely on mail agents such as Netscape™ Communicator™, Eudora™ or Microsoft™ Outlook Express™ to maintain a partially unified view of a single mailbox accessed from multiple locations. For example, using IMAP4, Jane Doe can see her "jdoe@corporate.com" mailbox from her work using Netscape Communicator™ and she can see that same mailbox from home using Microsoft Outlook Express™. However, neither POP3 nor IMAP4 attempt to provide a unified view of a message received at multiple mailboxes and stored on multiple clients.

Similarly, some handheld computers such as the Palm Connected Organizer™ from 3Com Corporation, Santa Clara, Calif., enable a single mailbox to be viewed on multiple clients through a HotSync™ process. Like POP3 and IMAP4, this process only addresses the viewing of a single mailbox from multiple clients.

One approach some users take to handling multiple mailboxes is to forward all messages received at one mailbox to the other mailboxes. For example, if John Smith sent Jane Doe a message to her corporate mailbox, "jdoe@corporate.com", Jane can set up her corporate mailbox so that all messages are forwarded to her other mailboxes, including her wireless mailbox, "jdoe@wireless.com".

However, if Jane responds to the message from her handheld client while viewing the wireless mailbox, there is no mechanism for reflecting that action in her other mailboxes, including her corporate mailbox. Thus, when she next checks her other mailboxes, including her corporate mailbox, she will have to manually perform the actions she performed on the message in the wireless mailbox.

For example, if she replied to the message on her handheld client and filed it in a folder "Personal", she would have to manually mark the message as replied to and manually file the message in "Personal" when she next accesses her corporate mailbox. This manual system becomes increasingly unwieldy as a person receives more messages per day.

Also, wireless connectivity is costly. The price per transmission unit is typically high. Also, other cost factors such as battery drain from transmission and receiving exist. Therefore, it may not be desirable to fully reflect a standard mailbox to a wireless mailbox using the above forwarding technique. Also, this forwarding technique can create loops that cause messages to be sent in infinite loops. Therefore, it is typically necessary to forward messages to a particular mailbox only, e.g. corporate to handheld, but not handheld to corporate.

Accordingly, what is needed is a system supporting a unified view of messages from multiple mailboxes that allows actions performed on one client to be reflected in the unified view on other clients. Also, the system should work with handheld wireless computers without incurring high costs.

SUMMARY OF THE INVENTION

A method of presenting a unified view of two mailboxes, each mailbox associated with a client is described. The unified view allows the user to see all actions she/he performed on one client reflected in all other unified clients. For example, if a user receives a message from "tbrown@example.com" at her "jdoe@corporate.com" mailbox, that message will also appear in her other mailboxes being unified, e.g. her "jdoe@wireless.com" mailbox.

One of the clients, e.g. the handheld client, has both a high cost, e.g. wireless, communication channel and a low cost, e.g. synchronization, communication channel. The high cost communication channel may have a price associated with transmitting information and their may be non-price cost factors such as battery consumption, bandwidth, and/or other factors that make the use of the high cost communication channel expensive. In contrast the low cost communication channel is typically free, e.g. docking cradle to desktop computer, and uses less power, etc. Thus, the two communication channels are used in conjunction to offer a unified view.

When a message is received by a client from its respective mailbox without an identifier, an identifier is generated and a copy of the message is sent to the other mailboxes with the identifier. For example, when the client receives the message addressed to the "jdoe@corporate.com" mailbox from "tbrown@example.com", there is no identifier associated with the message. An identifier is generated and a copy of the message is sent to the other mailboxes that includes the identifier. This allows actions performed on the message at a later point on any of the clients to be reflected in the other clients. Messages received with an identifier can be displayed without modification as these messages have already been handled by one of the other clients.

When the user performs actions on a message with a client, the identifier for the message and the action can be conveyed to the other clients in a message to the other mailboxes. For example, when Jane deletes the message with the identifier "jdoe@wireless.com:93" from her wireless client, a message can be sent to the other clients that indicates the identifier and the action, here "deleted".

The unified view can be selectably updated either over the high cost communication channel or the low cost communication channel. Also, multiple actions can be batched into a single message to the other mailboxes.

The user can select options to control the unification process and the use of the high cost communication channel, e.g. summarize messages over 250 words and/or remove attachments. Other embodiments allow the use of the high cost communication channel to be further controlled by using rules to control what flows over that channel and what is held for when the low cost communication channel is available. For example, messages with a priority of urgent might be sent over the high cost communication channel, but other messages might be held until the lost cost communication channel is available. Thus the use of two communication channels enables the cost of performing the unification to be contained even when there are a large number of messages and or mailboxes to be unified.

BRIEF DESCRIPTION OF THE FIGURES

FIGS. 2–5 are process flow diagrams describing the unification process according to various embodiments of the invention.

DETAILED DESCRIPTION

A. Definitions

1. Message

Figure 1:
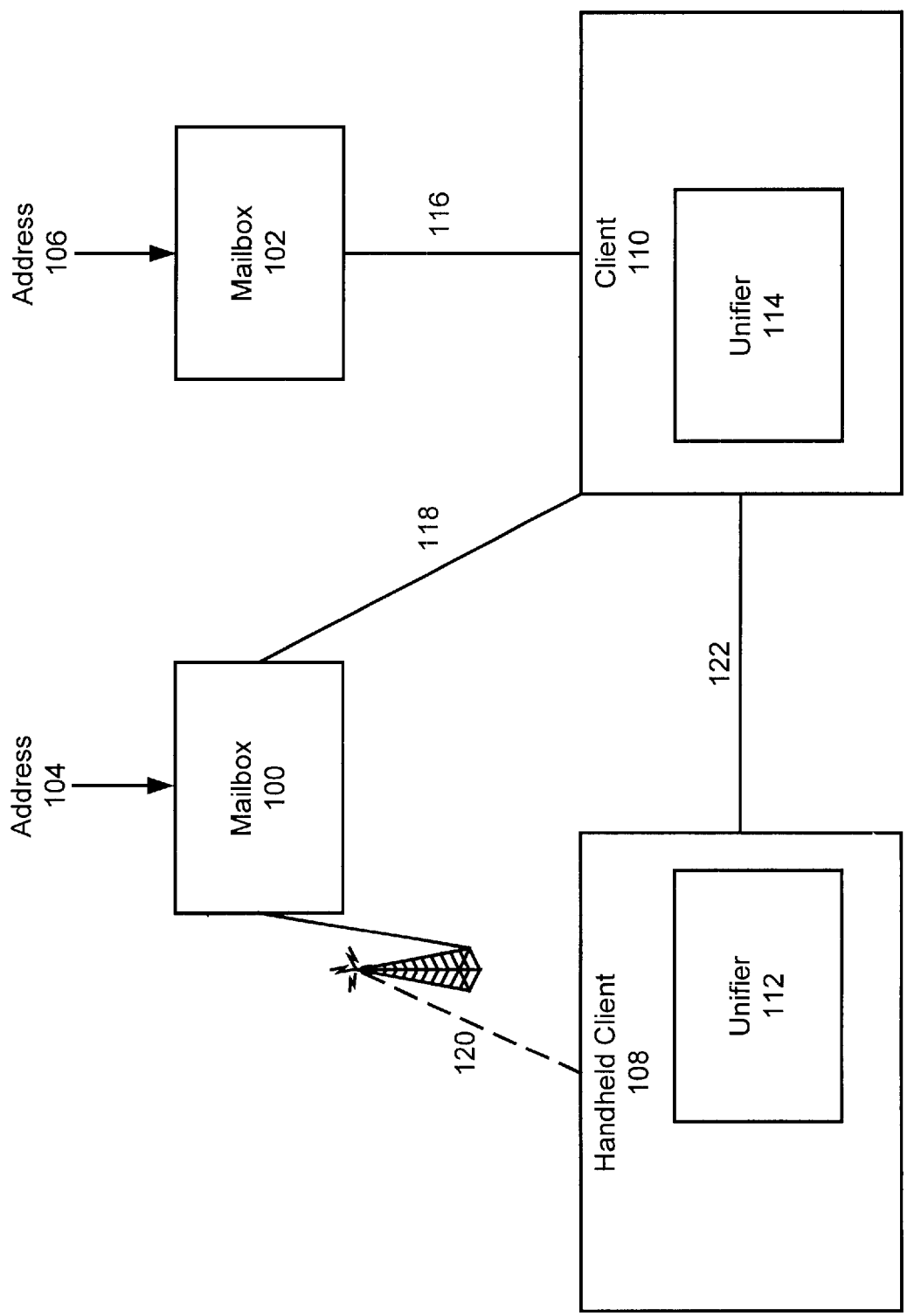
FIG. 1 illustrates a system including one embodiment of the invention.

A message, also an electronic mail message or an e-mail, is a communique from a person and/or machine to another person and/or machine. A message is typically comprised of two parts: a header and a body. The header includes addressing and routing information. The body includes the contents of the message, e.g. a memo, a short note, an attachment, and/or other contents. Users can send messages to other users and/or machines by specifying an address for the recipient. Users can receive messages from other users and/or machines at their mailboxes.

2. Mailbox

A mailbox is a storage area belonging to a user for messages. Each mailbox is associated with one or more electronic mail addresses that can be used to send the user messages. On the Internet, electronic mail addresses are comprised of a user identifier and a host name separated by an "@" symbol, e.g. "jdoe@corporate.com". Each mailbox has one, or more, addresses associated with it.

Messages sent to the user's address are stored in the user's mailbox. In some systems, the messages are stored on one or more servers. In other systems, the messages are stored directly on the user's computer. Still other systems mix the two approaches. For example, a UNIX server can provide mailboxes to several thousand users with the POP3 protocol and/or the IMAP4 protocol. In this configuration, the user's mailbox is stored on the UNIX server until the user retrieves the messages to her/his computer.

A mailbox accessed using POP3 and/or IMAP4 and the user's copy of that mailbox are considered a single mailbox. For example, if Jane Doe accesses her "jdoe@corporate.com" mailbox using IMAP4, the portion of the mailbox on the UNIX server and the portion of the mailbox on her computer are considered a single mailbox.

Some mail agents such as Microsof™ Outlook Express™, Netscape™ Communicator™ and Qualcomm™ Eudora™ allow multiple mailboxes to be viewed on a single client. In this case, all of the mailboxes accessed by the user's mail agent can be treated as a single mailbox to be unified with the other mailboxes. For example, if Jane's corporate computer uses Eudora™ to access two mailboxes: "jdoeEcorporate.com" and "webmaster@corporate.com", then she can select to have either and/or both mailboxes unified with her other mailboxes.

3. Action

The term action refers to activities relating to messages. For example, after reading a message with a client, a change is made to the message on many systems to mark the message as read. Other examples of actions include replying to a message, forwarding a message, classifying a message, deleting a message, receiving a message, and/or other actions.

4. Unified View

The term unified view as it applies to messages, and mailboxes, means that the same message has the same status, filing location, etc., on all clients. For example, upon reading a message on one client, if the message is marked read in the other mail agents, then the view is unified.

The unification process can take some time. For example, if a user of the Palm VII™ does not activate their wireless link often or synchronize their handheld with their desktop often, the view inside the Palm VII™ client may not reflect the most current actions and messages received by the other clients, and vice versa.

B. System Overview

FIG. 1 illustrates a system including one embodiment of the invention. In the system of FIG. 1, a unified view is being provided of two mailboxes: a corporate mailbox and a wireless mailbox. The corporate mailbox could be a Microsoft Exchange™ mailbox hosted on Windows NT™, or some other type of mailbox. The wireless mailbox could be a Palm.Net™ wireless mailbox for a Palm VII™ Connected Organizer from 3Com Corporation, Santa Clara, Calif., or some other type of wireless mailbox. Although only two mailboxes are shown, some embodiments of the invention support more than two mailboxes.

The following paragraph lists the elements of FIG. 1 and describes their interconnections. FIG. 1 includes a mailbox 100, a mailbox 102, a handheld client 108, and a client 110. The handheld client 108 includes a unifier 112. The client 110 includes a unifier 114. An address 104 is associated with the mailbox 100. An address 106 is associated with the mailbox 102. The client 110 has a communication channel 116 with the mailbox 102 and a communication channel 118 with the mailbox 100. The handheld client 108 has a high cost communication channel 120 with the mailbox 100 and a low cost communication channel 122 with the client 110.

The following describes the use of the elements of FIG. 1. The mailbox 100 and the mailbox 102 are mailboxes such as a UNIX mailbox, a simple mail transfer protocol (SMTP) mailbox, a Microsoft Exchange™ mailbox, a Lotus Notes™ mailbox, a wireless mailbox, a POP3 mailbox, an IMAP4 mailbox, and/or some other type of mailbox. In this example, the mailbox 100 is a Palm.Net™ wireless mailbox. In this example, the mailbox 102 is a POP3 mailbox.

The address 104 and the address 106 allow messages to be sent to the respective mailboxes 100 and 102. In this example, the address 104 is "jdoe@wireless.com" and the address 106 is "jdoe@corporate.com".

The handheld client 108 and the client 110 are devices with software and/or hardware for accessing the respective mailboxes 100 and 102. The handheld client 108 and the client 110 could be computers, thin client computers, set-top boxes, hand held computers, cellular telephones, pagers, and/or some other type of device. In this example, the handheld client 108 is a Palm VII™ and the client 110 is a computer.

The communication channel 116 and the communication channel 118 can be of several types such as a network channel, a dial-up channel, a wireless channel, and/or some other type of channel. Additionally, multiple types can be used in combination. For example, a dial-up channel and a network channel could be used on a laptop depending on whether the laptop is coupled to a network or dialing in to a network. In this example, the client 110 is connected to a local area network (LAN) such as an Ethernet network for communication with the mailbox 102.

The handheld client 108 has two channels: the high cost communication channel 120 and the low cost communication channel 122. The high cost communication channel 120 has a greater cost associated with it for transmitting and/or receiving data than on the low cost communication channel 122. For example, a wireless communication channel of the type used on pagers and wireless computers is an example of a high cost communication channel because the per transmission unit price is high. Additionally, the cost can take into account factors such as battery usage, power consumption, bandwidth limits, usage limits, and/or other cost factors. The low cost communication channel 122 might include a synchronization channel, a serial channel, a network channel, an infrared channel, a HotSync™ channel, and/or some other type of communication channel. Whereas the high cost communication channel 120 is expensive, the low cost communication channel 122 is cheap in terms of price, bandwidth, battery consumption, etc.

The unifier 112 and the unifier 114 can be standalone software applications, mail agent plug-ins, mail rules, procmail routines, mail handlers, part of the mail agent, and/or some other type of program. The unifier 112 and 114 are able to access messages either directly from the mail server serving their respective mailbox or once the mail has been transferred by the mail agent to the respective client.

A unifier (e.g. the unifier 112 and the unifier 114) can assign each message a distinguishing identifier. This identifier can be incorporated into the header of a message, e.g. add a header "X-UNIFY-ID: identifier". If a message received by the unifier already has an identifier associated with it, the unifier will not assign a second identifier. Again, this can be implemented by examining the message headers to ascertain if an X-UNIFY-ID header is present. In some embodiments, an additional Multipurpose Internet Mail Extensions (MIME) section including the identifier is added to message bodies instead of adding a header.

The identifier itself should be at least unique across the contents of the mailboxes being unified. Thus, a simple counter combined with a name or number associated with the unifier can be used. For example, the unifier 112 could prefix identifiers it creates with "jdoe@wireless.com:" and a number starting from say "0" and incrementing the counter each time. Similarly, the unifier 114 could prefix identifiers it creates with "jdoe@corporate.com:" and a number. Other types of identifiers could be used such as identifiers dependent on the contents of one or more message headers and/or the message body.

The unifier (e.g. the unifier 112 and the unifier 114) can send a copy of the message including the identifier to the other mailbox using the corresponding address. For example, if a message to addressed to "jdoe@corporate.com" from "tbrown@example.com" is received at the mailbox 102, then it will be assigned an identifier by the unifier 114. For example, the identifier assigned might be "jdoe@corporate.com:97". A copy of the original message—or a portion of the original message—is then sent to the address 104, "jdoe@wireless.com". The copy will include the identifier. In some embodiments, the identifier is included as an additional header to the message, e.g. "X-UNIFY-ID: jdoe@corporate.com:97". Similarly, for a message sent to the address 104, a copy will be sent to the address 106 with a distinguishing identifier by the unifier 112. If the copy of the message is excerpted or modified from the original format, this can be so indicated in the message sent to the other mailboxes.

In some embodiments, the unifier 114 accepts user defined parameters to control which messages and/or which portions of messages are sent to the address 104. Because of the high cost of using the high cost communication channel 120, it may be undesirable to send large messages and or message attachments to the address 104. In some embodiments, the user can select whether or not attachments are included when sent to the address 104. In some embodiments, the user can select a predetermined amount of a message to be sent to the address 104, e.g. first 250 words, etc. In some embodiments, the user can request that the unifier 114 summarize messages longer than a predetermined amount and send the summary to the address 104 along with the identifier. Also, the user may request that attachments be translated into a format usable by the handheld client 108.

The unifier (e.g. the unifier 112 and the unifier 114) can send messages when actions occur. The messages can be sent periodically from the unifier 114 to the address 104. The message content for an action would typically be a single line comprising two parts: the identifier and the action description. For example, if Jane reads the message from "tbrown@example.com" on her handheld client 108, an action message such as "jdoe@corporate.com:97 read" will be generated. Or, if Jane files the message the following action can be sent: "jdoe@corporate.com:97 filed business", etc.

In some embodiments, information about multiple actions are combined into a single message. For example, the unifier 114 might send messages to the address 104 every twenty minutes and at that point all unsent actions are sent. Each action can appear on a separate line of the message, e.g.:

jdoe@corporate.com:97 deleted jdoe@wireless.com:32 read jdoe@corporate.com:98 filed business jdoe@corporate.com:90 replied jdoe@wireless.com:30 forwarded These actions can all be encapsulated inside a MIME section of an appropriate type to signal to the other unifier (e.g. the unifier 112) that the message requires processing. Alternatively, a mail header could indicate that the message requires processing.

Assuming the above five actions were sent in a message from the unifier 114 to the unifier 112, then when the message is received by the unifier 112, it will perform the listed actions on the messages on the handheld client 108. Thus, after receiving the actions and processing them, the messages on the handheld client 108 will look the same as the messages on the client 110. Further, all actions taken on the client 110 will be reflected on the handheld client 108.

The financial costs of the high cost communication channel 120 can be considered by examining one wireless plan offered by Palm.Net™ that could be accessible to the handheld client 108 for use as the high cost communication channel 120. The plan allows for 150 Kilobytes (KB) of transmission each month and charges $0.30 for each additional KB. For any significant volume of mail, relying on the high cost communication channel 120 for unification could quickly become prohibitively expensive. The based monthly amount of 150 KB would cover about 250 short messages—including the copies of messages sent by the unifier 114, the copies of messages sent by the unifier 112, and/or messages conveying actions from the unifier 112 and the unifier 114.

Further, the battery consumption and other factors need to be considered in the cost.

Thus, the low cost communication channel 122 can reduce the overall cost of the unification process. When the handheld client 108 establishes the low cost communication channel 122, then the unifier 114 can unify the mail across the low cost communication channel 122 and remove any messages not yet received by the handheld client 108 from the mailbox 100 using the communication channel 118. Similarly, any pending messages that the unifier 112 has not yet transmitted over the high cost communication channel 120 can be sent to the unifier 114 via the low cost communication channel 122.

In this example, the five actions listed above sent in the message by the unifier 114 to the mailbox 100 have not yet been transferred to the handheld client 108. When the handheld client 108 connects to the client 110 over the low cost communication channel 122, the five actions are performed on the handheld client 108 and the message with the five actions is removed from the mailbox 100. This saves costs because the handheld client 108 will not retrieve messages it has already seen from the mailbox 100 when the high cost communication channel 120 is used next.

C. Process Flow

FIGS. 2–5 are process flow diagrams describing the unification process according to various embodiments of the invention. These could be used by the unifiers (e.g. the unifier 112 and the unifier 114) to unify the view of multiple mailboxes on multiple mail agents.

Figure 2:
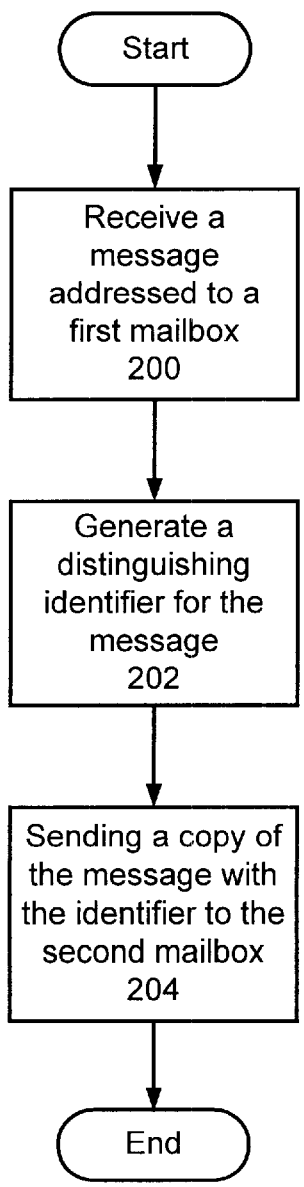

FIG. 2 is a process flow diagram for receiving a message without an identifier according to some embodiments of the invention. At step 200, the message is received by the mail agent from a first mailbox (e.g. the mailbox 102). Messages with known identifiers do not have an additional identifier generated. For example, if the unifier 114 is set to work only with the mailbox 102 and the mailbox 100, if a message is received with an identifier such as "someuser@foo.com:1005", then a new identifier can be generated. In some embodiments, the user of the client 110 is prompted as to whether this is identifier indicates a new mailbox which the unifier 114 should unify.

Next, at step 202, a distinguishing identifier is generated for the message by the unifier on that client (e.g. the unifier 114). The distinguishing identifier should be unique across the unified mailboxes. A combination of the address corresponding to the initial mailbox a message was received at with. an incrementing counter can be used as the identifier. In other embodiments, headers in the message are used to generate the identifier.

At step 204, a copy, or a portion, of the message is sent to the second mailbox (e.g. the mailbox 100) with the identifier. In some embodiments, the identifier is included in a message header. In other embodiments, the identifier is included in a MIME section with a copy of the original message in another MIME section.

User defined criteria and system defined limits can control the message contents. For example, attachments might be removed and/or translated into alternate formats before sending the message to the second mailbox. Messages longer than a certain length can be reduced to a predetermined size and/or summarized automatically. Additionally, mail filters can be used such as only unifying messages with a certain priority and/or that meet a certain criteria. For example, only messages whose priority is set to urgent could be unified. Another example might be to only unify messages from senders in a list of important clients. In other embodiments, these filters might be used to control which messages are sent for delivery over the high cost communication channel 120. In this embodiment, when the low cost communication channel 122 is employed, the remaining messages can be unified.

The unifier (e.g. the unifier 114) can keep a record of identifiers for messages it sent over the communication channel 118 for delivery to the handheld client 108. In some embodiments, the unifier can periodically poll the mailbox 100 to determine which messages have been delivered to trim the record so it contains only those messages not yet delivered to the handheld client 108.

Similarly, the unifier 112 on the handheld computer can hold messages until either the high cost communication channel 120 or the low cost communication channel 122 can be used. In some embodiments, the unifier 112 can be set to always wait for access to the low cost communication channel 122 to send its messages—including messages with actions. This reduces use of the high cost communication channel 120. This may be acceptable because typically a user of the handheld client 108 will be able to use the low cost communication channel 122 when they are next accessing their mailbox 102 using the client 110. Therefore in this embodiment, a user might synchronize their handheld client 108 with their client 110 before proceeding to use the mail agent on the client 110.

Figure 3:
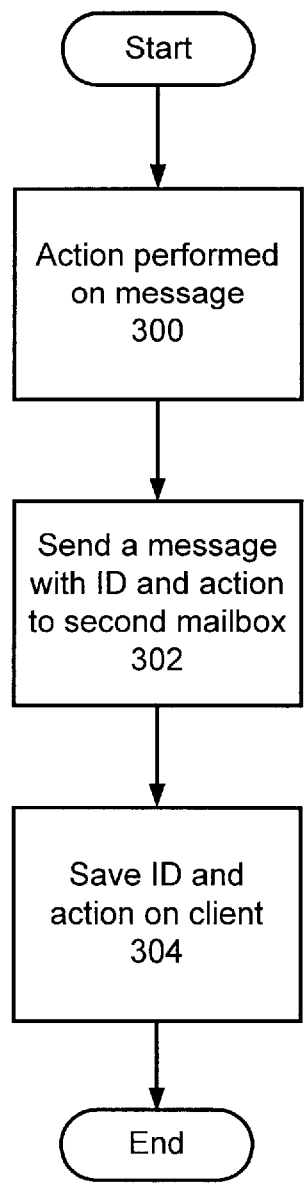

FIG. 3 is a process flow diagram for reflecting actions performed on messages to the other mailboxes. First at step 300, an action is performed on a message on a client (e.g. the client 110).

Next, at step 302, a new message is created by the unifier (e.g. the unifier 114) with the identifier of the message on which the action was performed and a description of the action. In some embodiments, multiple actions are combined into one message as described above. On the handheld client 108, step 304 can be skipped because either the messages will be available on the handheld client 108 when the low cost communication channel 122 is used next, or they will have already been sent over the high cost communication channel 120 and received by the client 110. If the high cost communication channel 120 is not being used by the handheld client 108 for some or all messages, then for those messages step 302 can be skipped and step 304 will be performed after step 300.

Lastly, at step 304, the identifier and action are stored on the client in a record of actions. The contents of the mailbox 100 can be polled periodically by the unifier 114 in some embodiments of the invention to determined what actions have already been received by the handheld client 108 and to trim the record of actions.

FIG. 4 is a process flow diagram for unifying the mailboxes over the high cost communication channel 120. First, a step 400, the handheld client 108 connects to its mailbox (e.g. the mailbox 100) over the high cost communication channel 120. The mailbox 100 will contain appropriate messages from the unifier 114 reflecting messages sent to the mailbox 102 as well as actions performed on messages on the client 110.

At step 402, the messages from the mailbox 100 are used to unify the view of the messages in the handheld client 108. If a message in the mailbox 100 has no identifier, then the process of FIG. 2 is applied. If the message has an identifier, then it is added to the view. If the message includes identifiers and actions, the appropriate actions are performed on messages with the respective identifier.

For example, a new message sent directly to "jdoe@wireless.com" will undergo the process of FIG. 2. A copy of a message sent originally to "jdoe@corporate.com"

together with an identifier, e.g. "jdoe@corporate.com:94", will be added to the unified view. A message with identifiers and actions, e.g. the action "jdoe@corporate.com:94 read" will be acted upon. Thus, upon receiving the third message with the action, the message on the handheld client 108 with that identifier will have its status set to read. The result is that the handheld client 108 has a unified view of the mailboxes 100 and 102.

Next, at step 404, the handheld client 108 sends messages it has received but not already sent to the mailbox 102 over the high cost communication channel 404. This could include the copies of messages generated at step 204 and the messages with actions generated at step 302. In some embodiments, step 404 is skipped to reduce the usage of the high cost communication channel 120. In other embodiments, messages matching certain criteria are sent over the high cost communication channel 120, while others are held to be sent over the low cost communication channel 122.

FIG. 5 is a process flow diagram for unifying the mailboxes over the low cost communication channel 122. First at step 500, the handheld client 108 connects to the client 110 over the low cost communication channel 122.

Next, at step 502, the two views are unified. Messages, both the copies of messages with identifiers and messages with actions, sent by the client 110 to the mailbox 100 but not yet received by the handheld client 108 are sent over the low cost communication channel 122 to unify the message view on the handheld client 108. Similarly, messages on the handheld client 108 not yet sent to the client 110 are sent over the low cost communication channel 122 to unify the message view on the client 110.

Finally, at step 504, the unifier on the client 110 signals to the mailbox 100 to remove messages. This ensures that the next time the handheld client 108 retrieves messages over the high cost communication channel 120, unnecessary messages are not retrieved. This could take the form of a mail message from the unifier 114 indicating which messages are to be deleted or a proprietary signal between the unifier 114 and the mail server handling the mailbox 100. For example, a special port on the mail server might be designated to receive encrypted communications from the client 108 specifying the messages to be deleted. In other embodiments, the communication might simply indicate that the views are unified and to remove any messages from the mailbox 100 that originated from the unifier 114.

D. Alternative Embodiments

In some embodiments, the unifier 112 and the unifier 114 are implemented as one or more computer programs. The computer programs can be included in one or more computer usable media such as CD-ROMs, floppy disks, or other media.

Some embodiments of the invention are included in an electromagnetic wave form. The electromagnetic wave form comprises information such as the unifier 112 and the unifier 114. For example, the electromagnetic wave form could include signals sent over a network from a server computer to a client computer with the unifier 112 and/or the unifier 114.

E. Conclusion

The foregoing description of various embodiments of the invention has been presented for purposes of illustration and description. It is not intended to limit the invention to the precise forms disclosed. Many modifications and equivalent arrangements will be apparent.

What is claimed is:

1. A method for exchanging electronic messages between a fist computer and a second computer, the first computer being coupleable to the second computer using a high cost communication channel and a low cost communication channel, the method comprising;

accessing a first message addressed for a first mailbox;

determining an identifier for the first message on the first computer;

signaling at least a portion of the first message and the identifier to a second mailbox;

detecting a user-action affecting a property of the first message in the first mailbox;

responsive to the user-action, automatically signaling the identifier of the message and an identification of the action to the second mailbox;

detecting a selection for one of either the high cost communication channel or the low cost communication channel; and responsive to the selection, using the identifier of the message and the identification of the action to indicate on the second computer the property of the first message in the first mailbox using the selected one of the high cost communication channel or the low cost communication channel.

2. The method of claim 1, wherein detecting a user-action affecting a property of the first message in the first mailbox includes detecting a user-action affecting a status of the first message in the first mailbox.

3. The method of claim 2, wherein detecting a user-action affecting a status of the first message in the first mailbox includes detecting a deletion of the first message within the first mailbox.

4. The method of claim 3, further comprising automatically signaling the distinguishing identifier and an identification of the deletion to the second mailbox so as to cause the first message to be deleted within the second mailbox.

5. The method of claim 1, wherein detecting a user-action affecting a property of the first message in the first mailbox includes detecting a move of the first message within the first mailbox.

6. The method of claim 5, further comprising automatically signaling the distinguishing identifier and an identification of the move to the second mailbox so as to cause the first message to be moved within the second mailbox.

7. The method of claim 6, wherein detecting a move of the first message within the first mailbox includes detecting the first message as being marked read.

8. The method of claim 1, wherein using the identifier of the message and the identification of the action to indicate on the second computer the property of the first message includes signaling a communication from the second mailbox to the second computer using the high cost communication channel, the communication comprising the identifier of the first message and the identification of the user-action.

9. The method of claim 8, wherein signaling a communication from the second mailbox to the second computer using the high cost communication channel includes signaling the communication from the second mailbox to the second computer without signaling the communication to the first computer.

10. The method of claim 1, further comprising unifying the property of the first message in the first mailbox with a property of the first message in the second mailbox.

11. An apparatus for presenting a unified view of a first message, sent to a first mailbox coupled by a first communication channel to a first client, on a second client the first client having a second communication channel to communicate with a second mailbox and a low cost communication channel to communicate with a second client, the second client capable being coupleable to communicate with the second mailbox using a high cost communication channel, the apparatus comprising:

means for receiving the message at the first client;

means for generating a distinguishing identifier for the first message;

means for sending at least a portion of the first message and the distinguishing identifier to the second mailbox using the second communication channel;

means for creating a second message including the distinguishing identifier and a description of the action responsive to an action on the first message on the first client;

means for sending the second message to the second mailbox using the second communication channel; and means for selectably updating the unified view of the first message on the second client using either the high cost communication channel or the low cost communication channel.

12. The apparatus of claim 11, wherein the means for generating a distinguishing identifier for the first message comprises:

means for generating a string with an address corresponding to the first mailbox;

means for generating an increasing number; and means for adding a header to the first message, the header including the increasing number and the string.

13. The apparatus of claim 11, wherein the means for generating a distinguishing identifier for the first message comprises means for computing a secure hash of a portion of the first message.

14. The computer data signal of claim 13, wherein the third set of instructions further comprises a seventh set of instructions for automatically summarizing messages larger than a predetermined size.

15. A computer data signal embodied in a carrier wave comprising:

a computer program for a unifier on a first client the computer program including a first set of instructions for accessing a first message;

a second set of instructions for attaching a distinguishing identifier to the first message;

a third set of instructions for sending at least a portion of the first message and the distinguishing identifier to a second mailbox;

a fourth set of instructions for detecting an action of a user on the first message;

a fourth set of instructions for creating a second message including the distinguishing identifier and a description of the action;

a fifth set of instructions for sending the second message to the second mailbox to update the unified view of the first message on a second client if the second client accesses the second mailbox using a high cost communication channel;

a sixth set of instructions for selectably updating the unified view of the first message on the second client if the second client couples to the first client using a low cost communication channel.

16. The computer data signal of claim 15, wherein the computer program further includes a seventh set of instructions for accepting signals to control use of the high cost communication channel and the low cost communication channel.

17. The computer data signal of claim 15, wherein the computer program further comprises an eighth set of instructions for defining a filter, the filter for selecting whether the first message should be updated using the high cost communication channel.

18. The computer data signal of claim 15, wherein the computer program comprises an eighth set of instructions for translating an attachment included in the first message from a first format into a second format.

19. A computer program product comprising:

a computer usable medium having a computer readable program code embodied therein including an interface to a mail agent on a client and a unifier, the interface permitting the unifier to access a message on the client and update the view of the message in the mail agent on the client; and wherein the unifier can selectively update a unified view of a message on a second client using either a high cost communication channel or a low cost communication channel.

20. The computer program product of claim 19, wherein the interface comprises a messaging application programming interface compliant interface.

21. The method of claim 1, wherein using the identifier of the message and the identification of the action to indicate on the second computer the property of the first message includes signaling a communication from the second mailbox to the second computer using the low cost communication channel, the communication comprising the identifier of the first message and the identification of the user-action.

22. A method for exchanging electronic messages between a first computer and a second computer, the first computer being coupleable to the second computer using either a high cost communication channel or a low cost communication channel, the method comprising:

receiving a first message addressed for a first location for storing messages;

automatically signaling at least a portion of the first message and a distinguishing identifier to a second location;

detecting a user-action affecting a status of the first message in the first location;

receiving a selection to update the second location using one of either the high cost communication channel or the low cost communication channel; and responsive to the selection, automatically signaling the distinguishing identifier and an identification of the action to the second location using the selected one of the high cost communication channel or the low cost communication channel, so as to indicate in the second location the status of the first message in the first location.

23. The method of claim 22, wherein detecting a user-action affecting a status of the first message in the first mailbox includes detecting a deletion of the first message within the first mailbox.

24. The method of claim 23, further comprising automatically signaling the distinguishing identifier and an identification of the deletion to the second mailbox so as to cause the first message to be deleted within the second mailbox.

25. The method of claim 24, wherein detecting on the first computer a user-action affecting a status of a first mailbox includes receiving a first message addressed for a first mailbox.

26. The method of claim 22, wherein detecting a user-action affecting a status of the first message in the first mailbox includes detecting the first message as being marked read.

27. A method for exchanging electronic messages between a first computer and a second computer, the first computer being coupleable to the second computer using either a high cost communication channel or a low cost communication channel, the method comprising:

detecting on the first computer a user-action affecting a status of a first message of a first mailbox for storing a plurality of messages;

receiving a selection to update a view of a second mailbox using one of either the high cost communication channel or the low cost communication channel; and responsive to the selection, automatically signaling the status of the first message to the second mailbox to update the view of the second mailbox on the second computer to include the status of the first message.

28. The method of claim 27, wherein receiving a selection to update a view of a second mailbox using one of either the high cost communication channel or the low cost communication channel includes detecting the second computer coupling to the first computer using a serial port.

* * * * *